Patented Sept. 6, 1949

2,480,982

UNITED STATES PATENT OFFICE 2,480,982

PRODUCTION OF CHLORINATED ALIPHATIC COMPOUNDS

Peter James Thurman and John Downing, Spondon, near Derby, England, assignors, by mesne assignments, to Celanese Corporation of America, a corporation of Delaware No Drawing. Application October 19, 1945, Serial No. 623,444

2 Claims. (Cl. 260—658)

This invention relates to the manufacture of chlorinated aliphatic hydrocarbons.

One process of making chlorinated aliphatic hydrocarbons is by the reaction of the hydrocarbon with free chlorine in the presence of iodine, antimony or a chloride of antimony, or iron or a salt of iron, especially ferric chloride. These susbtances are usually referred to as "chlorine-carriers," and need be present only in small proportions. Although this process has the advantage of simplicity and cheapness, its usefulness is greatly impaired by the fact that it generally gives rise to a mixture of products of different degrees of chlorination.

We have now found that 1:1:2-trichlorethane and alkyl substitution products thereof can be made by chlorinating ethylene dichloride and alkyl substitution products thereof at temperatures above 60° C. in the presence of a small amount of a chloride of phosphorus, and that these tri-chlorinated compounds can in this way be obtained almost or quite free from higher chlorinated compounds so long as the temperature is not allowed to rise too high. This is the more surprising, in that chlorine will not react to any substantial degree with ethylene dichloride, even at its boiling point, in the presence of the usual chlorine-carriers such as iron filings, antimony powder, or antimony trichloride, or of hydrogen chloride.

According to the invention therefore 1:1:2-trichlorethane and alkyl substitution products thereof are made by bringing free chlorine into contact with ethylene dichloride or an alkyl substitution product thereof at a temperature above 60° C. in the presence of a small proportion of a chloride of phosphorus.

The preferred method of carrying out the reaction is to add the chloride of phosphorus, preferably phosphorus pentachloride, to the dichlorinated hydrocarbon, to heat the mixture to the desired temperature, and then to pass a stream of chlorine through the mixture, taking care that the chlorine is broken up into fine bubbles, for example by introducing it through a finely perforated disc or the like and/or by vigorously stirring or otherwise agitating the dichlorinated hydrocarbon. It is usually advantageous to stop the flow of chlorine before all the dichlorinated hydrocarbon has been chlorinated, since as the concentration of the dichlorinated hydrocarbon decreases owing to the formation of increasing quantities of the tri-chlorinated hydrocarbon, the rate at which the chlorine is absorbed also decreases. The resulting mixture consists almost entirely of the dichlorinated and trichlorinated hydrocarbons together with the chloride of phosphorus; the two chlorinated hydrocarbons are easily separated by fractional distillation, and the unchanged dichlorinated hydrocarbon may then be used again.

As already stated, while the temperature employed must be above 60° C. to cause the chlorine to react with the dichlorinated hydrocarbon, unduly high temperatures may cause the formation of a certain amount of tetra-chlorinated hydrocarbons. The exact temperature which gives the best results depends on the particular dichlorinated hydrocarbon which is being used, and also to some extent on the other reaction conditions. As a general rule the best results are obtained at temperatures of 70°–120° C., and especially at temperatures of 80°–105° C. For example, the reaction between ethylene dichloride and chlorine may with advantage be started at the boiling point of the ethylene dichloride, i. e. at about 83° C.; as the proportion of 1:1:2-trichlorethane in admixture with the ethylene dichloride increases, the boiling point of the mixture rises, and if the reaction temperature is raised correspondingly the rate of the reaction and therefore the amount of ethylene dichloride converted into 1:1:2-trichlorethane in a given time are substantially increased. For instance, by continuing the reaction at the boil until the temperature reaches about 103°–105° C. about twice as much ethylene dichloride is converted into 1:1:2-trichlorethane as when the reaction is carried out ceteris paribus for the same period at 83° C. Above about 100° C. a little tetrachlorethane may be formed, but the amount is so small that for most purposes it can be ignored.

Although the reaction proceeds satisfactorily under atmospheric pressure, higher pressures may if desired be employed, for example pressures up to 5 or 10 atmospheres.

The amount of the chloride of phosphorus used may be quite small, for example between 1 and 5%, and preferably about 2 to 3%, of the weight of the dichlorinated hydrocarbon.

Among the trichlorinated hydrocarbons besides 1:1:2-trichlorethane which may be made by the process of the present invention are 1:2:2-trichlorpropane, which may be made from propylene chloride, and 2:2:3-trichlorbutane, which may be made from 2:3-dichlorbutane.

The invention is illustrated by the following example:

Example

Ethylene dichloride containing 2 to 3% of its weight of phosphorus pentachloride is introduced into a still fitted with a reflux condenser, and is heated to boiling. Chlorine is then fed into the still by an inlet pipe issuing through a finely perforated plate near the bottom of the still. The contents of the still are kept boiling, and as the reaction between the chlorine and ethylene dichloride proceeds the temperature gradually rises. When the temperature has risen to about 103 to 105° C. the flow of chlorine is stopped. The contents of the still are then discharged, and subjected to fractional distillation to separate the 1:1:2-trichlorethane formed in the reaction from unreacted ethylene dichloride. The latter may be returned to the still as part of a fresh charge.

Having described our invention, what we desire to secure by Letters Patent is:

1. Process for the manufacture of 1:1:2-trichlorethane, which comprises bringing free chlorine into contact with ethylene dichloride, to which a small proportion of phosphorus pentachloride has been added, while the ethylene dichloride containing the phosphorus pentachloride is at a temperature of 80°–105° C.

2. Process for the manufacture of 1:2:2-trichlorethane, which comprises leading chlorine into a mixture of ethylene dichloride and 1:1:2-trichlorethane, to which has been added 1%–5% (of the weight of the ethylene dichloride) of phosphorus pentachloride, while the mixture is kept boiling under atmospheric pressure.

PETER JAMES THURMAN.
JOHN DOWNING.

REFERENCES CITED

The following references are of record in the file of this patent:

UNITED STATES PATENTS

| Number | Name | Date |
| --- | --- | --- |
| 721,961 | Marckwald | Mar. 3, 1903 |
| 1,362,355 | Saunders et al. | Dec. 14, 1920 |
| 2,174,737 | Coleman et al. | Oct. 3, 1939 |

FOREIGN PATENTS

| Number | Country | Date |
| --- | --- | --- |
| 545,993 | Germany | Mar. 8, 1932 |